No. 805,628. PATENTED NOV. 28, 1905.
H. BÜTTNER.
TREE FELLING WINDLASS.
APPLICATION FILED APR. 11, 1905.

Witnesses:
Jean Grund.
Emil König.

Inventor:
Heinrich Büttner

UNITED STATES PATENT OFFICE.

HEINRICH BÜTTNER, OF LANGD, NEAR HUNGEN, GERMANY.

TREE-FELLING WINDLASS.

No. 805,628.      Specification of Letters Patent.      Patented Nov. 28, 1905.

Application filed April 11, 1905. Serial No. 255,067.

*To all whom it may concern:*

Be it known that I, HEINRICH BÜTTNER, a subject of the German Emperor, and a resident of Langd, near Hungen, Germany, have invented certain new and useful Improvements in Tree-Felling Windlasses to Throw Blazed Trees in a Certain Direction, of which the following is a specification.

The present invention refers to an appliance the purpose of which is to throw over trees to be felled in a certain direction, so that the people employed, as well as the surrounding cultivation, are protected from damage.

This appliance consists, in the main, of a crosstree which rests against the tree to be felled and which is movable in its longitudinal direction by means of a toothed-bar windlass-work with wheel connecting-gear parallel to a supporting-tree, which latter transmits the pressure exercised to fell the tree to the ground by means of a movable foot-plate, as well as a suitably-anchored chain fastened to same.

Figure 1:
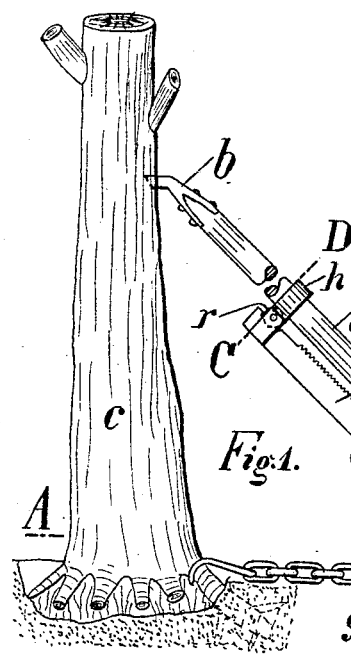
Figure 2:
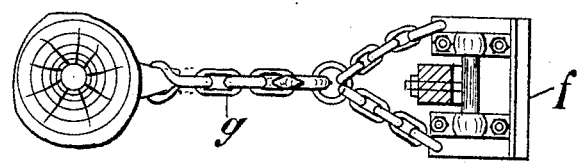
Figure 3:
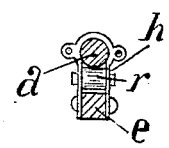
Figure 4:
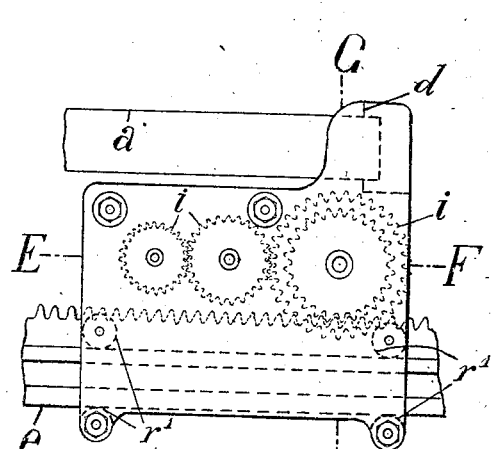
Figure 5:
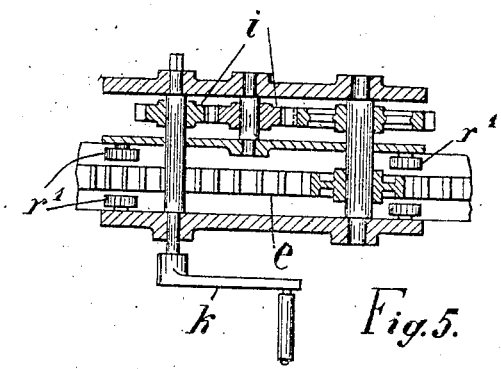
Figure 6:
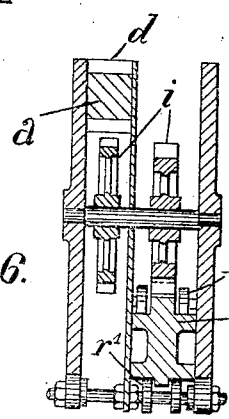

In the accompanying sketch, Figure 1 shows the appliance in front view. Fig. 2 represents a cross-section on line A B, Fig. 1. Fig. 3 a section on line C D, Fig. 1. Fig. 4 shows a side view of the windlass. Fig. 5 represents a section through the windlass on line E F, Fig. 4. Fig. 6 shows a section through the windlass on line G H, Fig. 4.

The tree-felling windlass is placed against the tree in a slanting position and opposite to the direction in which the tree to be felled is to fall. It consists of a crosstree $a$, which on the one part grips the hewed or blazed tree $c$ by means of a fork $b$ and on the other part is, however, fixed in the shoe $d$ of the windlass-work, which rolls on a supporting-tree $e$. This transmits the pressure exercised by the windlass-work in such a manner to the ground that the vertical pressure is taken up by a foot-plate $f$ and the horizontal pressure, which brings about the slipping of the supporting-tree, by a suitably-anchored chain $g$, fastened to the foot-plate. By the working of the windlass-work the crosstree is moved in its longitudinal direction parallel to the supporting-tree until the blazed tree falls to the ground by the pressure exercised.

The crosstree $a$, set in the shoe $d$ of the windlass-work, slides for the purpose of better guidance and connection with the supporting-tree $e$ on a roller $r$, Fig. 3, attached to its upper end, which is placed in a bow $h$, which latter serves to set up the appliance.

Figs. 4 to 6 represent the windlass-work, which is guided by rollers $r$ on the supporting-tree. The same consists of a toothed-bar windlass with double-wheel connecting-gear $i$, which is worked by means of movable cranks $k$.

What I claim as my invention, and desire to secure by Letters Patent, is—

In an appliance for felling trees, the combination with a toothed bar $e$, a windlass arrangement, which can be moved on the toothed bar, and a rod $a$ which sits rigidly on the windlass arrangement and can be moved parallel with same, of means, to fasten this rod to the tree and to keep the friction arising by its movement as slight as possible, and of means, to take up the horizontal and vertical pressure arising in the bar, so as to prevent a slipping of the appliance.

In testimony whereof I have signed my name to this specification in the presence of two subscribing witnesses.

HEINRICH BÜTTNER.

Witnesses:
    JEAN GRUND,
    EMIL KÖNIG.